United States Patent [19]

Holmes

[11] Patent Number: 4,689,144
[45] Date of Patent: Aug. 25, 1987

[54] DISPOSABLE FILTER UNIT FOR AUTOMATIC TRANSMISSION FLUID

[75] Inventor: Kevin J. Holmes, Clayton, Australia

[73] Assignee: Australian Pacific Marketing Pty. Ltd., Victoria, Australia

[21] Appl. No.: 716,262

[22] Filed: Mar. 26, 1985

[30] Foreign Application Priority Data

Mar. 27, 1984 [AU] Australia .............................. PG 4269
Jan. 16, 1985 [AU] Australia .............................. PG 8906

[51] Int. Cl.⁴ ................................................ B03C 1/30
[52] U.S. Cl. ................................ 210/130; 123/196 A; 210/223; 210/446; 210/695
[58] Field of Search ............... 210/130, 222, 223, 446, 210/695, 741, 806; 335/302, 303, 305; 123/196 A, 197 R; 209/214, 223 R

[56] References Cited

U.S. PATENT DOCUMENTS

| | | | |
|---|---|---|---|
| 2,926,787 | 3/1960 | Combest | 210/223 |
| 2,976,999 | 3/1961 | Paton | 210/223 |
| 3,342,339 | 9/1967 | Riolo | 210/223 |
| 3,727,761 | 4/1973 | Aspinwall et al. | 210/223 X |
| 3,784,011 | 1/1974 | Ward | 210/223 X |
| 3,890,232 | 6/1975 | Combest et al. | 210/223 |
| 3,985,588 | 10/1976 | Lyman | 335/302 X |
| 4,053,410 | 10/1977 | Lorimor | 210/223 |
| 4,372,852 | 2/1983 | Kovacs | 210/222 |
| 4,495,068 | 1/1985 | Rosaen | 210/223 |
| 4,496,303 | 1/1985 | Loubier | 335/303 X |

FOREIGN PATENT DOCUMENTS

| | | |
|---|---|---|
| 1197569 | 7/1965 | Fed. Rep. of Germany . |
| 1242316 | 6/1967 | Fed. Rep. of Germany . |
| 962739 | 6/1950 | France .............................. 210/223 |
| 1314202 | 4/1973 | United Kingdom . |
| 2042360 | 9/1980 | United Kingdom ............... 210/223 |
| 2042914 | 10/1980 | United Kingdom . |

Primary Examiner—Richard V. Fisher
Assistant Examiner—W. Gary Jones
Attorney, Agent, or Firm—Schwartz, Jeffery, Schwaab, Mack, Blumenthal & Evans

[57] ABSTRACT

An automatic transmission fluid filter has a casing consisting of a main casing portion and a cap. Generally axial spigots, are provided on the casing portion and the cap for connection into a fluid line. Within the casing there is a disc-shaped magnet and a paper element cartridge the magnet being located adjacent the entry spigot such that all fluid flowing through the spigot passes within the effective range of the magnet.

A bypass valve may be provided in the paper element cartridge to allow fluid at a pressure above a predetermined level to bypass the paper filter.

8 Claims, 3 Drawing Figures

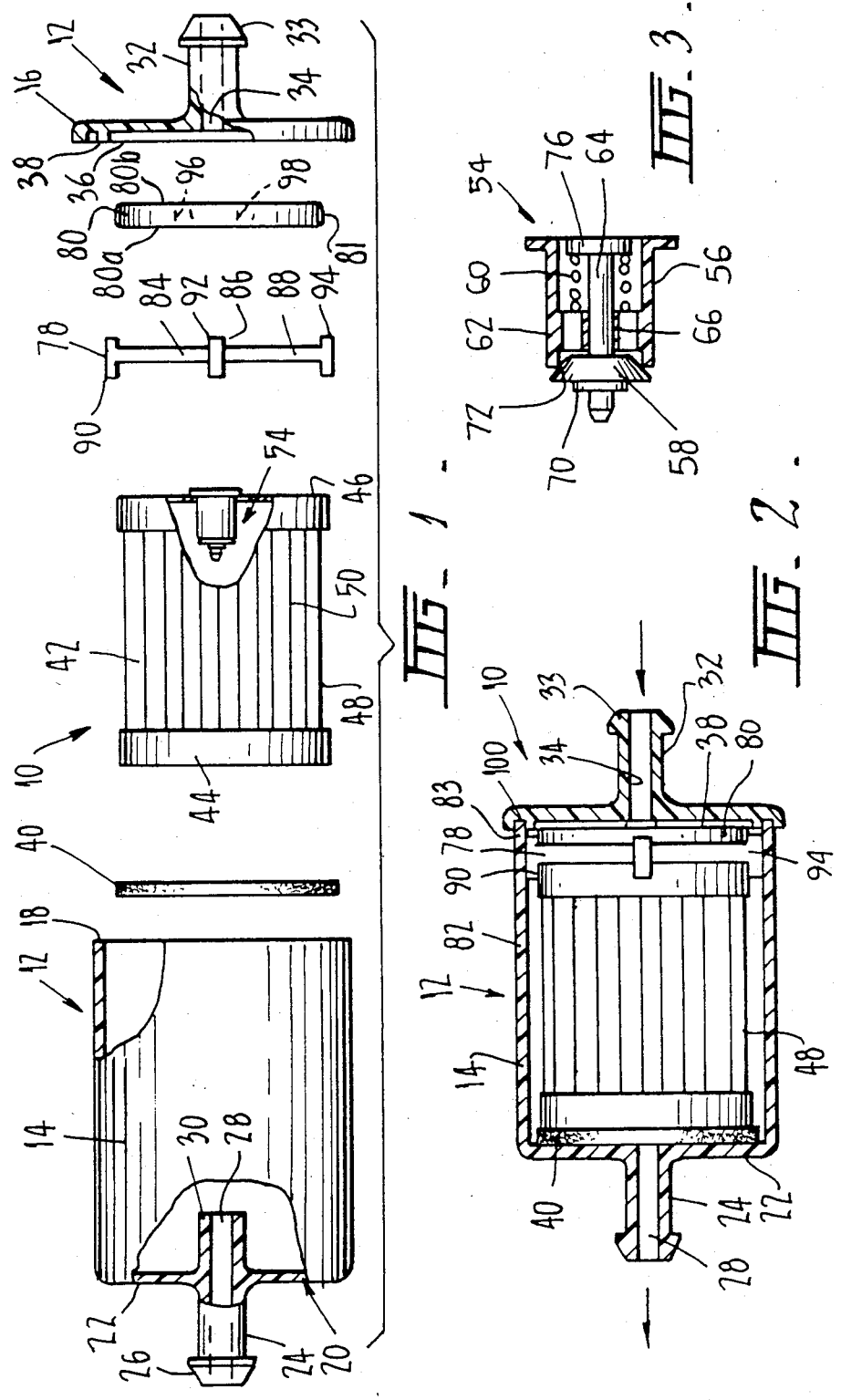

DISPOSABLE FILTER UNIT FOR AUTOMATIC TRANSMISSION FLUID

BACKGROUND OF THE INVENTION

1. Field of the Invention

This invention relates to a filter, and more particularly relates to a filter for removing solid particles from a fluid.

In fluid used to lubricate automatic transmissions, such as those connected to internal combustion engines, it has been found that metal particles which are shed by elements of the transmissions during normal wear and tear act in an abrasive manner and are therefore damaging to the transmission.

2. Description of the Prior Art

Prior art arrangements for removing such particles have included the location of a small magnet in the transmission housing. However, such an arrangement is capable of removing only a very small percentage of metal particles, as most of the fluid does not come within the effective range of the magnet.

The use of magnets in filters for the lubricating oil of internal combustion engines is known. In GB 2042360A, there is disclosed a disposable filter in which is located a magnet. However, the magnet is located in an area which is not subject to the full flow of the oil, and thus is not likely to be very effective in removing metal particles from the oil. In addition, the oil flow is not through the casing of the filter, but enters and leaves at the same end thereof.

For the abovementioned reasons, the filter of GB 2042360A would not be suitable for removing particles from automatic transmission fluid, as it is essential that such a filter rapidly removes metal particles in the fluid, to prevent damage occuring to complex automatic transmission equipment.

BRIEF SUMMARY OF THE INVENTION

It is an object of this invention to produce an improved apparatus for filtering fluid, which will remove a much higher percentage of solid material from the fluid.

The invention provides a disposable filter for automatic transmission fluid comprising:

a casing, said casing being composed of casing elements which may be secured together to form said casing, there being fluid entry and exit ports located generally at either end of said casing;

mechanical filtration means located within said casing; and magnetic filtration means located within the casing, said means consisting of a disc-like magnet formed from a material in which is suspended magnetic particles; said magnet being located in said casing such that it is opposite said entry port, and such that all points of the fluid flow through said entry port pass within the effective range of said magnet, said fluid thereafter flowing, in use, through said mechanical filtration means to said exit port.

The invention further provides a disposable filter for automatic transmission fluid, including a generally cylindrical casing formed from thermoplastic casing elements which have been sonically welded together said casing having axial entry and exit spigots;

mechanical filtration means located within said casing, said means comprising a generally cylindrical folded paper element held within circular caps;

fluid bypass means located in the upstream one of said caps, said bypass means including a spring-loaded valve element responsive to a predetermined pressure in said fluid upstream of said means;

and magnetic filtration means located opposite said entry spigot such that all points of the flow of said fluid pass within the effective range of said means, said means comprising an apertured disc-like magnet formed from a plastics material in which are suspended magnetic particles, said magnet being spaced from said one end cap by spacing means;

wherein said fluid normally flows over or through said magnet, between said casing and said mechanical filtration means and through said filter paper to said exit spigot.

BRIEF DESCRIPTION OF THE DRAWINGS

FIG. 1 is an exploded elevation of one embodiment of a filter according to the invention;

FIG. 2 is a longitudinal section through an assembled filter; and

FIG. 3 is an enlarged sectional view of the pressure relief valve of FIG. 1.

DESCRIPTION OF THE PREFERRED EMBODIMENT

The filter 10 comprises a casing 12 consisting of a main casing portion 14 and a cap portion 16. The casing portions 14,16 are injection moulded from plastics material which can be sonically welded together to form a sealed unit.

Casing portion 14 is generally cylindrical, with an open end 18; a generally closed end 20 and a casing side wall 82. Closed end 20 has a web 22, extending outwardly from which is a spigot 24, with an annular flange 26 at the end thereof. The spigot has an internal axial passage 28, which also passes through an internally extending tubular spigot 30, which connects the interior and exterior of the casing portion 14.

Cap portion 16 is generally circular, with an outwardly extending spigot 32 with an annular flange 33 at the end thereof, and with an axial passage 34 therein. The internal face 36 of cap portion 16 has four ribs 38 (two of which are shown in FIG. 2) each of which is located 90° from the next rib.

Seal 40 is adapted to be located within casing portion 14. It is a circular piece of plastic material with a central aperture, and is adapted to be located over spigot 30, against the internal face of web 22.

The paper element cartridge 42 has two ends 44,46, which are preferably metallic. Between ends 44,46 is located a paper filter 48, which has a generally tubular construction, with a folded, ribbed or concertina-type side wall 50. End 44 has a central aperture (not shown) which is adapted to receive spigot 30. End 46 has a smaller central aperture 52, which opens into a pressure relief valve arrangement 54.

Pressure relief valve arrangement 54 has a generally cylindrical housing 56 which has a shaft 64 passing through an internal annular abutment 66. A frusto-conical sealing member 58 is secured to shaft 64 by a circular lip 70. Sealing member 58 normally makes a seal with the edge 72 of the inner end of housing 62, under the force of a spring 60 which is retained between shaft flange 76 and abutment 66.

A magnet support member 78 is provided to locate a magnet 80 and space it from the side wall 82 of the casing 12. The member 78 has four legs, three of which are shown as 84,86 and 88. Each leg is angularly spaced 90° from the adjacent leg, and each leg has a foot (three of which are shown as 90,92 and 94) each of which extends generally at right-angles to the respective leg to both sides thereof.

Magnet 80 is generally in the shape of a flattened cylinder having opposing faces 80a and 80b and a perimeter 81. It is preferably formed from a plastic material, in which material is suspended magnetic particles. The magnet 80 is provided with four apertures (two of which are shown as 96,98 in FIG. 1) or may have a single aperture.

Cap portion 16 also has on its internal surface an annular groove 100 which is adapted to receive the circular edge of side walls 82 at open end 18 of portion 14.

The filter 10 is assembled by locating the various elements of FIG. 1 within casing portion 14, in the order in which they appear in the figure. Seal 40 and cartridge 42 slide over spigot 30. The feet 90,92,94 of spacing member 78 rest on end 46 of cartridge 42, and serves to space the end from the walls 82.

Magnet 80 is held within the other ends of feet 90,92,94 such that the opposing faces 80a, 80b are substantially perpendicular to the fluid flow from the passage 34, which defines a fluid entry. The feet provide that the magnet is spaced from the side wall 82 of the casing, as mentioned above, along the perimeter 81, thereby forming a gap 83. Lastly, cap portion 16 is fitted onto portion 14, is sonically welded (or otherwise attached) thereto, to provide the sealed unit of FIG. 2.

The filter 10 is intended to be placed in a fluid supply line of an automatic transmission, preferably before the radiator, by means of hoses which may be attached to spigots 24,33.

A used filter 10 may be removed from the hoses, be disposed of, and be replaced by another unit.

The automatic transmission fluid enters the filter 10 via the passage 34 in spigot 33. The fluid is forced to flow over the surface of magnet 80, and some of it will flow through apertures 96,98. The spatial location of the magnet 80 with respect to the wall 82 of the casing portion 14 and the internal face of cap portion 16, means that no point in the fluid can pass by the magnet at more than the effective range thereof. The fluid, after passing either across the magnet 80 and through the gap 83, or through magnet 80, flows over the external face of end 46 and/or between the end 46 and the wall 82. As seal 40 prevents fluid from passing directly into spigot 30, the fluid must then pass through filter paper 48 and then through passage 28 to the automatic transmission fluid line. Thus, a second, mechanical, filtration step takes place.

It is not envisaged that the filter will become so clogged that pressure will build up on the supply side of filter 10. However, in the event that this did occur, pressure relief valve 54 would operate, the pressure depressing sealing element 58 and allowing fluid to flow directly to spigot 30 through the centre of cartridge 42.

Tests have been carried out on the filter 10 of this embodiment. The tests involved measurement of the numbers of particles removed by the filter under normal operating conditions from a standard mixture of iron powder particles in oil.

The filter 10 (without a paper filter cartridge 42) was mounted horizontally after first removing air therefrom, and was subjected to a flow rate of 850 ml/min of Mobil Automatic Transmission Fluid 220, from an initial total volume of 3 liters at a temperature of 50° C. The iron particles were added to the fluid in the amount of 1 g/l.

20 ml samples were taken from a sump at time intervals indicated in Tables 1 and 2. Each sample was diluted with filtered kerosene to 200 ml, after which the diluted sample was subjected to analysis by a HIAC Particle Size Analyser. The channel settings were as follows:

1. 10–20 μm
2. 20–30 μm
3. 30–40 μm
4. 40–50 μm
5. 50–60 μm
6. 60+ μm

Tables 1 and 2 set out the results obtained, in two different ways. Table 1 is data corrected for background count, so that represents the introduced magnetic particles only.

TABLE 1

| Size (μm) | Numbers of Particles by size range at particular times | | | | | | | |
|---|---|---|---|---|---|---|---|---|
| | Initial | 10 min | 20 min | 30 min | 45 min | 60 min | 90 min | 120 min |
| 10–20 | 44030 | 32157 | 13587 | 0 | 0 | 0 | 0 | 0 |
| 20–30 | 4206 | 1950 | 1163 | 320 | 233 | 290 | 27 | 33 |
| 30–40 | 726 | 433 | 270 | 43 | 220 | 90 | 129 | 105 |
| 40–50 | 186 | 160 | 89 | 13 | 106 | 16 | 46 | 0 |
| 50–60 | 80 | 73 | 30 | 9 | 60 | 23 | 40 | 5 |
| 60+ | 40 | 26 | 43 | 20 | 46 | 26 | 26 | 13 |

TABLE 2

| Size (μm) | Number of Particles expressed as percentages of the initial numbers | | | | | | |
|---|---|---|---|---|---|---|---|
| | 10 min | 20 min | 30 min | 45 min | 60 min | 90 min | 120 min |
| 10–20 | 72.8 | 30.8 | 0 | 0 | 0 | 0 | 0 |
| 20–30 | 46.3 | 27.6 | 7.6 | 5.5 | 6.9 | 0.6 | 0.8 |
| 30–40 | 59.6 | 37.1 | 5.9 | 30.3 | 12.4 | 17.7 | 14.5 |
| 40–50 | 86.0 | 47.8 | 6.9 | 57.0 | 8.6 | 24.7 | 0 |
| 50–60 | 91.2 | 37.2 | 11.2 | 75 | 28.7 | 50 | 6.2 |
| 60+ | 65.0 | 107.5 | 50.0 | 115.0 | 65.0 | 65.0 | 32.5 |

From Table 1, it can be seen that:
(a) initial particle removal is very fast
(b) virtually all of the magnetic particles have been removed after 60 minutes of operation.

Table 2 illustrates the rapid decline in percentage with time. The numbers become a little erratic because of the small quantities involved, but the initial trend is clear.

I claim:
1. A disposable filter for removing metallic particles from automatic transmission fluid comprising:
 (a) a filter casing having a body portion including an inner surface and first and second end walls at opposite ends of the body portion, means defining a fluid entry port located generally centrally in said first end wall, and means defining a fluid exit port located in said second end wall, said casing being closed except for said ports;

(b) mechanical filtration means mounted in said body portion of said casing;

(c) magnetic filtration means in the form of a disc-like magnet having inner and outer faces and having a diameter slightly less than the diameter of the inner surface of said casing so as to be spaced therefrom; and (d) mounting means positioned in said casing for mounting said magnet between one end of said mechanical filtration means and said first end wall and fluid entry port, said magnet being generally perpendicular to the longitudinal axis of said fluid entry port and directly opposite from said entry port, said mounting means being constructed and arranged so as to space the outer face of said magnet from said first end wall of said casing and said fluid entry port an amount no greater than the effective particle attraction range of the magnet;

whereby fluid entering the filter through said fluid entry port passes over said outer face of the magnet or through the space between said outer face and said first end wall of said casing so as to be within the effective range of the magnet whereby metallic particles are removed from the fluid, the fluid thereafter passing through said mechanical filtration means for further filtration of the fluid, and then to said fluid exit port.

2. The disposable filter of claim 1, wherein said mechanical filtration means is a paper filter, and wherein said filter further includes a fluid bypass means located in a support means for said paper filter, said fluid flowing through said bypass means rather than through said paper filter when the fluid pressure within said casing exceeds a predetermined value.

3. The disposable filter of claim 2 wherein said fluid bypass means includes a spring-loaded valve element responsive to a predetermined pressure in said fluid upstream of said fluid bypass means.

4. The disposable filter of claim 1, wherein said disc-like magnet is formed from a material in which is suspended magnetic particles.

5. The disposable filter of claim 1, wherein said mounting means includes a magnet support member positioned between said mechanical filtration means and said magnet, said support member spacing said magnet from said mechanical filtration means and positioning said magnet to define a gap between said perimeter of said magnet and a side wall of said casing, and wherein fluid from said entry port flows in a first direction substantially parallel to the outer face of said magnet facing said entry port and thereafter in a second direction through said gap and substantially parallel to said inner surface of said casing.

6. The disposable filter of claim 5, wherein said magnet support member comprises four legs, each said leg being angularly spaced about 90° from adjacent said legs, said legs each having a foot extending across an end of said leg at an angle of about 90°, said feet positioning said magnet from said inner surface of said casing to form said gap.

7. The disposable filter of claim 1, wherein said magnet defines at least one aperture through which said fluid may flow.

8. The disposable filter of claim 1 wherein said first and second ends of said body are formed with axial spigots that extend from said ends for attachment to a transmission fluid line.

* * * * *